United States Patent
Hung (10) Patent No.: US 7,916,462 B2
(45) Date of Patent: Mar. 29, 2011

(54) PORTABLE COMPUTER WITH A ROTARY POSITIONING STRUCTURE

(75) Inventor: Wen-Chin Hung, Taipei (TW)

(73) Assignee: ASUSTeK COMPUTER Inc., Taipei (TW)

( * ) Notice: Subject to any disclaimer, the term of this patent is extended or adjusted under 35 U.S.C. 154(b) by 0 days.

(21) Appl. No.: 12/471,959

(22) Filed: May 26, 2009

(65) Prior Publication Data

US 2009/0231796 A1 Sep. 17, 2009

Related U.S. Application Data (63) Continuation of application No. 11/584,514, filed on Oct. 23, 2006, now Pat. No. 7,548,414.

(51) Int. Cl.
*H05K 5/00* (2006.01)
*H05K 7/00* (2006.01)

(52) U.S. Cl. ......... 361/679.27; 361/679.06; 361/679.26; 361/679.55

(58) Field of Classification Search ............. 361/679.06, 361/679.26, 679.27
See application file for complete search history.

(56) References Cited

U.S. PATENT DOCUMENTS

| | | | |
|---|---|---|---|
| 5,168,423 A | 12/1992 | Ohgami et al. | |
| 6,751,090 B1 * | 6/2004 | Yang | 361/679.06 |
| 6,912,122 B2 * | 6/2005 | Chen et al. | 361/679.27 |
| 7,100,876 B2 | 9/2006 | Tseng et al. | |
| 7,113,397 B2 | 9/2006 | Lee | |
| 7,308,733 B2 | 12/2007 | An et al. | |
| 7,345,871 B2 | 3/2008 | Lev et al. | |

* cited by examiner

*Primary Examiner* — Jayprakash N Gandhi
*Assistant Examiner* — Anthony M Haughton
(74) *Attorney, Agent, or Firm* — Muncy, Geissler, Olds & Lowe, PLLC (57) ABSTRACT

A portable computer with a rotary positioning structure is disclosed, which includes a first body, a second body, a shaft including a first part disposed on the first body and a second part disposed on the second body, a seat disposed to the first body, and a button. The second body is rotatable with the second part relative to the first part in a rotary path. The button is movable on the seat between a first position where the button is engaged into the rotary path to prohibit the second body from rotation, and a second position where the button is out of the rotary path for allowing rotation of the second body.

9 Claims, 7 Drawing Sheets

PORTABLE COMPUTER WITH A ROTARY POSITIONING STRUCTURE

CROSS REFERENCE TO RELATED APPLICATIONS

This application is a continuation of application Ser. No. 11/584,514, entitled "Portable Computer with a Rotary Positioning Structure," filed on Oct. 23, 2006 now U.S. Pat. No. 7,548,414.

BACKGROUND OF THE INVENTION

1. Field of Invention

The present invention relates to a portable computer and more specifically, to a portable computer with a rotary positioning structure.

2. Related Art

In the current market, a high-class notebook computer or tablet personal computer usually has a dual pivot structure. In this type of the computer, one pivot structure allows the LCD display to be turned about X-axis relative to the base member of the computer. The other pivot structure allows the LCD display to be turned about a Y-axis relative to the base member of the computer.

Some commercially available dual pivot structure type notebook computers and tablet PCs have no positioning means to prevent movement of the LCD display relative to the base member accidentally. In other words, when opened the LCD display, the LCD display may move relative to the base member in the undesired direction. More particularly, if the LCD display is not locked and prohibited from rotary motion in horizontal direction, the LCD will be rotated horizontally when touched by the user accidentally.

Furthermore, there are dual pivot structure type notebook computers and tablet PCs with a positioning structure, wherein the positioning structure includes two swivel hooks or stop members for engaging a respective retaining hole at each of the two opposite lateral sides of the LCD display to prohibit rotation of the LCD display relative to the base member. When the user want to rotate the LCD display relative to the base member, the user must use two hands to disengage the swivel hooks or stop members from the respective retaining holes of the LCD display, so that the LCD display can be rotated horizontally relative to the base member. However, this positioning structure is not a perfect design because the user must use two hands to disengage the swivel hooks or stop members from the retaining holes of the LCD display when wishing to rotate the LCD display horizontally.

SUMMARY OF THE INVENTION

The present invention has been accomplished under the circumstances in view. The portable computer with a rotary positioning structure in accordance with the present invention includes a shaft, a first body, a second body, a seat, and a button. The shaft includes a first part, and a second part pivoted to the first part. The first body is disposed to the first part of the shaft. The second body is disposed to the second part of the shaft and movable with the second part of the shaft relative to the first part of the shaft to make a first rotary motion in a first rotary path. The seat is disposed to the first body. The button is coupled to the seat and movable between a first position and a second position. Further, the button has at least one part thereof inserted into the first rotary path to prohibit rotation of the second body in the first rotary path when the button is in the first position. The button is disposed beyond the first rotary path for allowing rotation of the second body in the first rotary path when the button is in the second position.

Therefore, the user can use one single hand to press the button and to move the button from the first position to the second position to unlock the second part for rotation.

The seat includes at least one retaining portion. The button includes at least one retaining portion adapted to engage the retaining portion of the seat. The at least one retaining portion of the button is respectively engaged with the at least one retaining portion of the seat when the button is in the second position. The at least one retaining portion of the button is respectively disengaged from the at least one retaining portion of the seat when the button is in the first position.

The rotary positioning structure further includes first flexible member connected between the button and the seat, and adapted to push the button from the second position to the first position when the second part is rotated to a first angle.

The seat includes a pivot member. The rotary positioning structure further includes a rotating member pivotally mounted on the pivot member. The rotating member includes a first cam and a second cam. The second cam is pushed by the second part of the shaft to move the button and to further force the at least one retaining portion of the button away from the at least one retaining portion of the seat for enabling the first flexible member to return the button to the first position when the second part of the shaft is rotated to the first angle.

The button includes at least one contact portion. The second part of the shaft includes at least one contact portion adapted to touch and rotate the first cam and to further force the first cam into contact with the at least one contact portion of the button.

The second body is also movable with the second part of the shaft relative to the first part of the shaft to make a second rotary motion in a second rotary path. The first rotary motion is to turn about a first axis. The second rotary motion is to turn about a second axis, which is perpendicular to the first axis.

Further, the seat is disposed to the first part of the shaft. The rotary positioning structure further includes second flexible member, which is a spring plate disposed to the seat and adapted to push the button to the first position when the second part is rotated to the first angle.

Further, the seat includes an accommodation chamber, which contains the first flexible member, and at least one sliding rail adapted to guide movement of the button between the first position and the second position.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

Referring to FIGS. 1~4, a portable computer 1 of the preferred embodiment of the present invention includes a shaft 3, a first body 10, a second body 20, a seat 50, a button 60, a first flexible member 65, a second flexible member 66, a rotating member 70, and an ornamental cap 80. In this embodiment, the first body 10 is a notebook base member 101, and the second body 20 is a LCD display 201.

Figure 1:
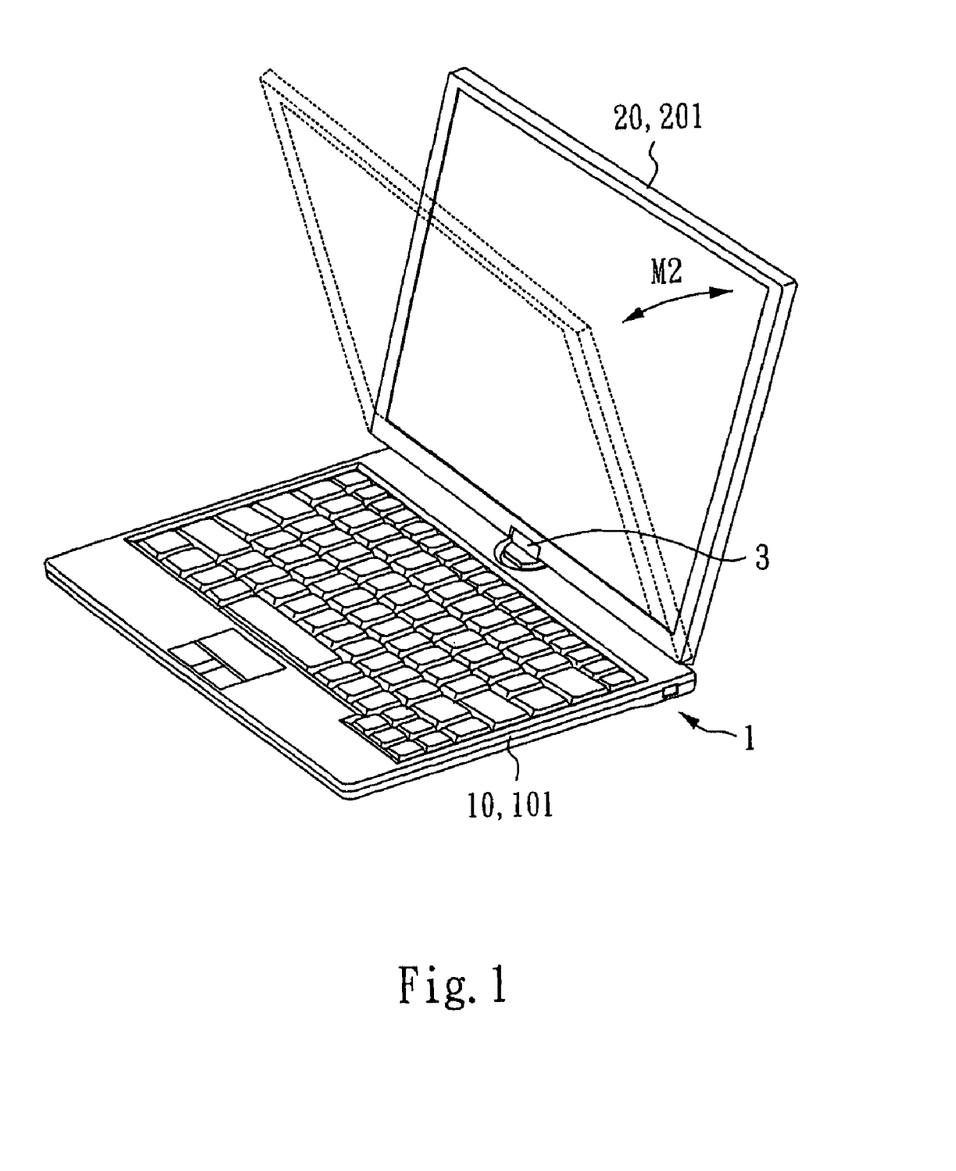
FIG. 1 is a schematic drawing showing rotation of the second body of a portable computer relative to the first body in X-axis direction according to the present invention.
Figure 2:
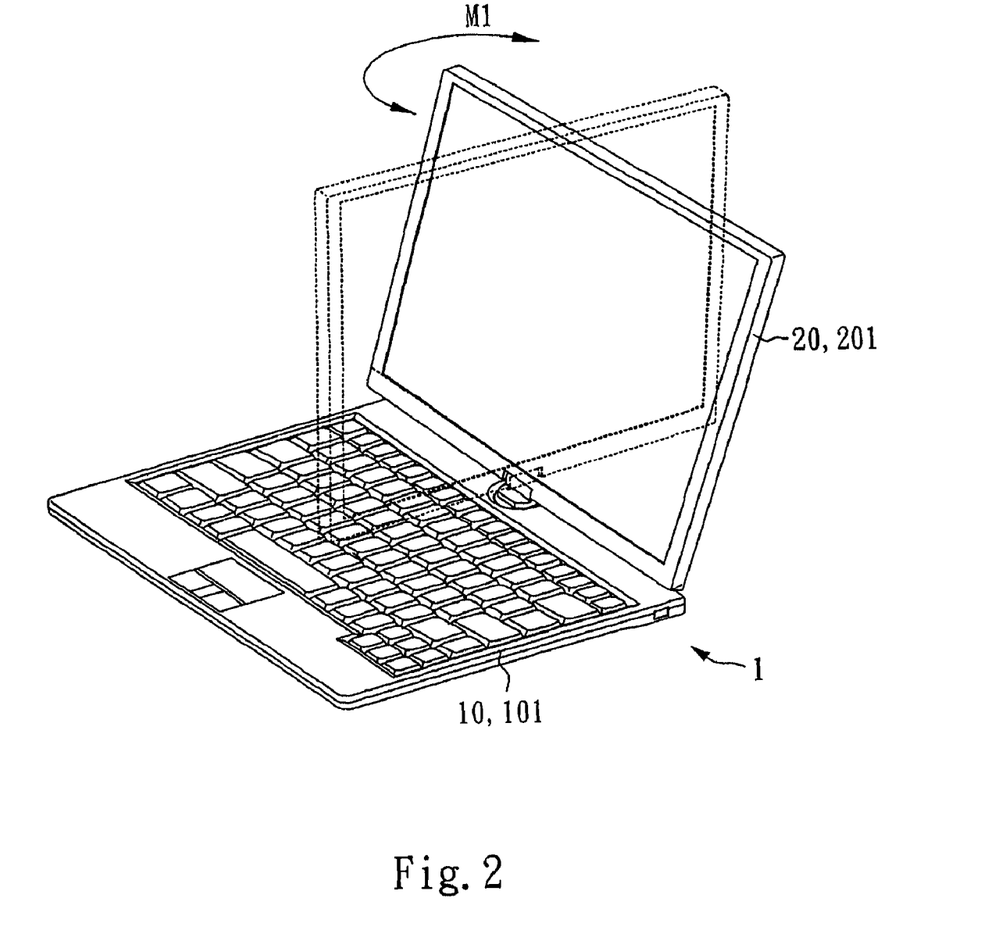
FIG. 2 is a schematic drawing showing rotation of the second body of the portable computer relative to the first body in Y-axis direction according to the present invention.
Figure 3:
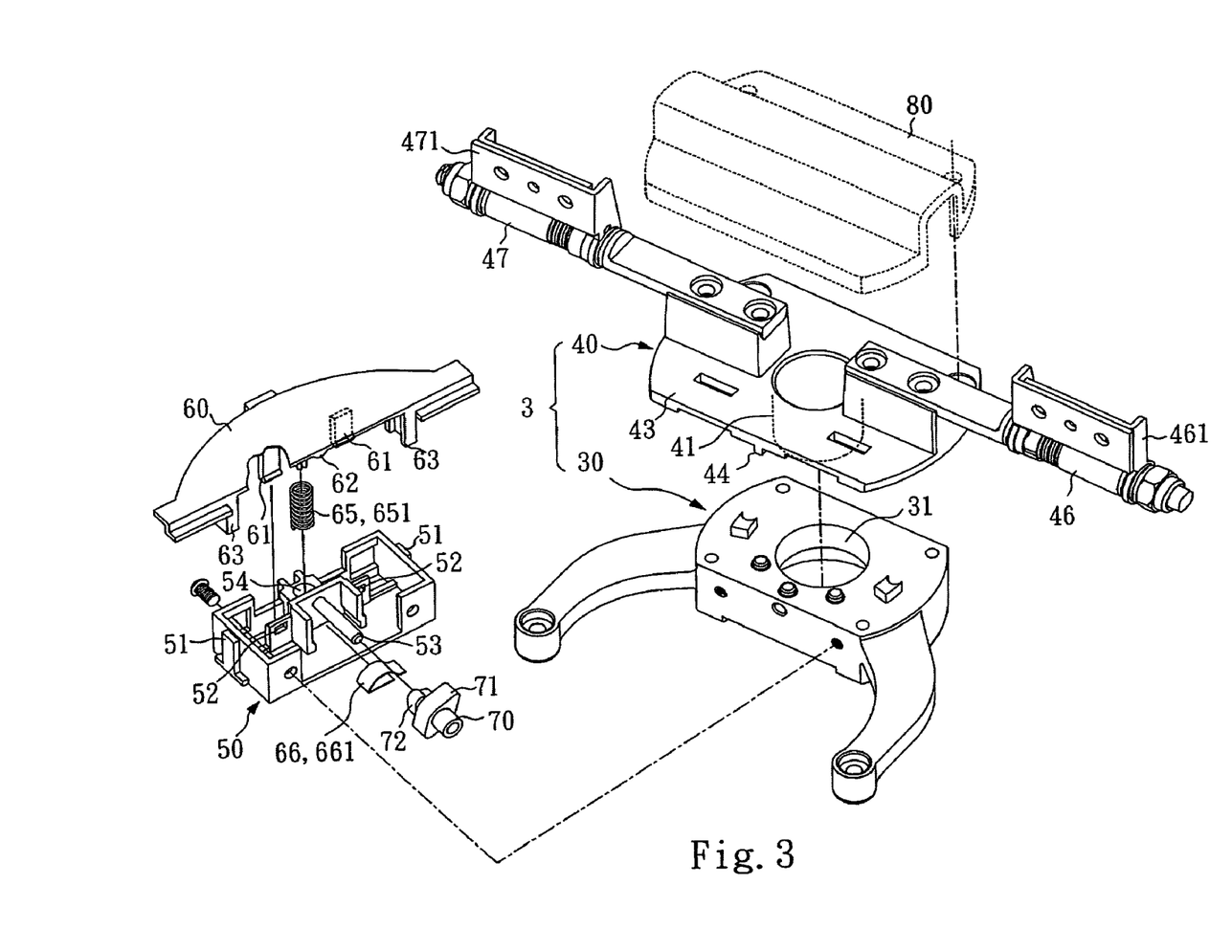
FIG. 3 is an exploded view of a rotary positioning structure according to the present invention.
Figure 4:
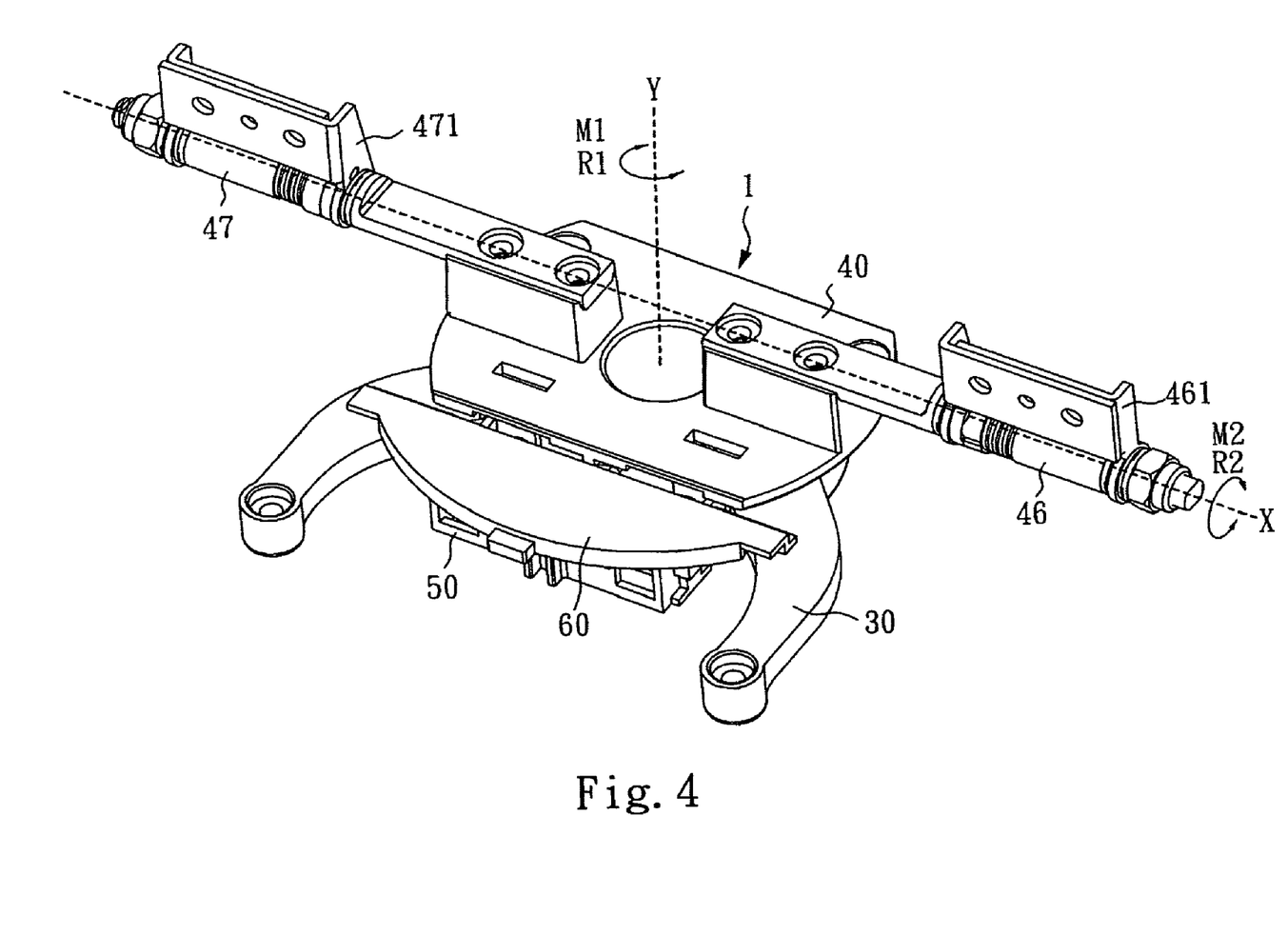
FIG. 4 is a perspective assembly view of the rotary positioning structure according to the present invention.

As shown in FIG. 3, the shaft 3 includes a first part 30 and a second part 40. Referring to FIGS. 2 and 3, the first part 30 is disposed on the first body 10 which has a pivot hole 31. The second part 40 including a spindle 41 and a turntable 43 is disposed on the second body 20. The spindle 41 is fixedly perpendicularly provided at the turntable 43 on the middle and pivotally coupled to the pivot hole 31 of the first part 30. Therefore, the second part 40 is rotatable relative to the first part 30. The turntable 43 has two contact portions 44 respectively downwardly protruding from the bottom wall on the middle of each of the two opposite lateral sides thereof. The second part 40 further includes a first hinge 46 and a second hinge 47 horizontally pivotally provided at the two ends thereof in parallel to the turntable 43 and aligned in a line, a first mounting frame 461 disposed to the periphery of the first hinge 46, and a second mounting frame 471 disposed to the periphery of the second hinge 47. The second body 20 is disposed to the first mounting frame 461 and the second mounting frame 471. The ornamental cap 80 is covered on the shaft 3 for decoration.

Further, the seat 50 is disposed to one lateral side of the first part 30 of the shaft 3. The seat 50 includes two sliding rails 51 disposed at two opposite sides, two retaining portions 52 bilaterally disposed on the middle, a middle accommodation chamber 54 disposed on the middle at one side relative to the retaining portions 52, and a pivot pin 53 disposed on the middle at an opposite side relative to the retaining portions 52. The accommodation chamber 54 contains the first flexible member 65. The rotating member 70 is pivotally mounted on the pivot pin 53, having fixedly mounted thereon a first cam 71 and a second cam 72. Further, the second flexible member 66 according to this embodiment is a spring plate 661 fastened to the seat 50 below the second cam 72.

As shown in FIG. 3, the button 60 is slidably supported on the sliding rails 51 of the seat 50. In addition, the button 60 has two retaining portions 61 downwardly extending from the bottom wall thereof corresponding to the retaining portions 52 of the seat 50, and a contact portion 62 downwardly protruded from the bottom wall. The aforesaid first flexible member 65 according to the present preferred embodiment is a coil spring 651 connected between the button 60 and the seat 50.

Referring to FIGS. 1, 2 and 4 again, the second body 20 is disposed to the second part 40 and operable to make a first rotation motion M1 along a first rotary path R1. The second body 20 is also operable to make a second rotary motion M2 along a second rotary path R2. The first rotary motion M1 means turning of the second body 20 about Y-axis. The second rotary motion M2 means turning of the second body 20 about X-axis, which is perpendicular to Y-axis.

Figure 5A:
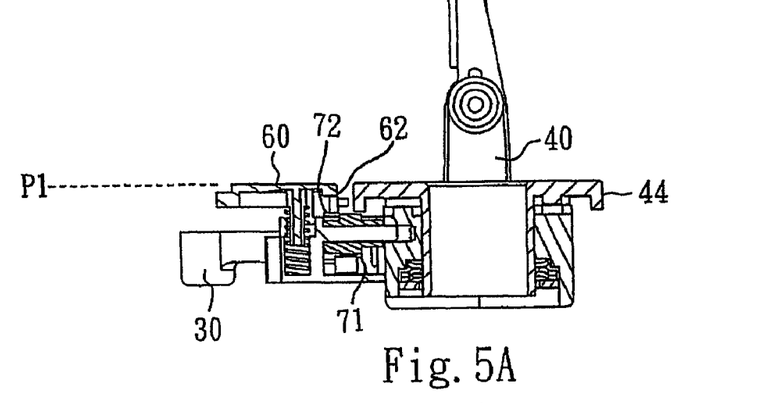
FIGS. 5A, 6A and 7A are schematic drawings showing the status of the rotary positioning structure before rotation of the second body relative to the first body.
Figure 5B:
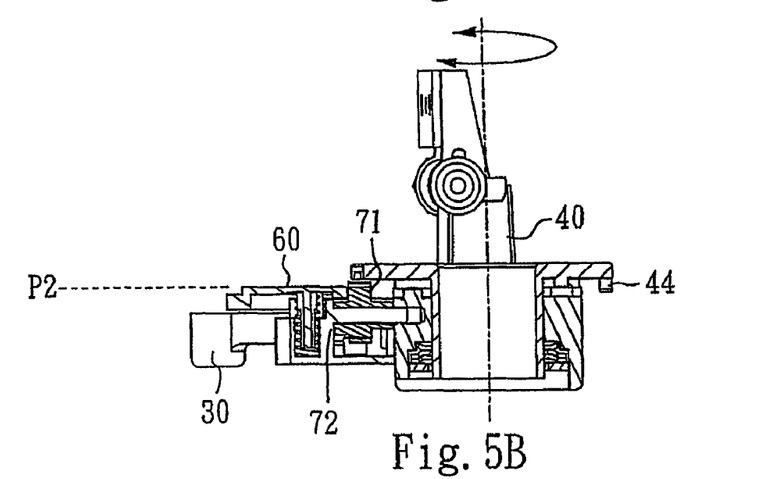
FIGS. 5B, 6B and 7B are schematic drawings showing the status of the rotary positioning structure after rotation of the second body relative to the first body through 170°.
Figure 5C:
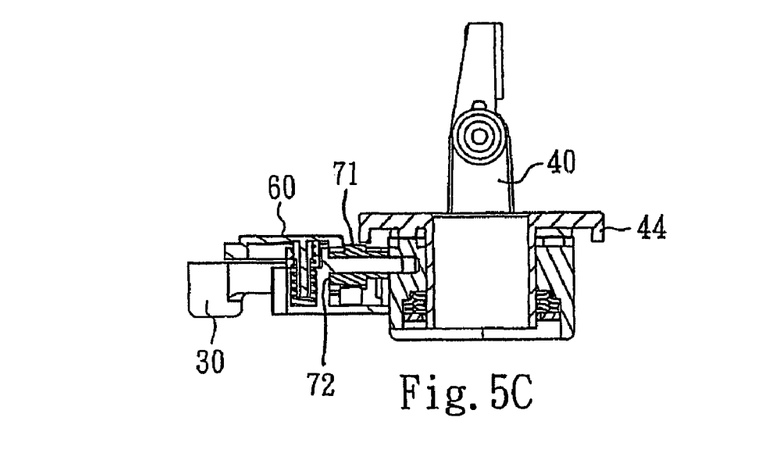
FIGS. 5C, 6C and 7C are schematic drawings showing the status of the rotary positioning structure after rotation of the second body relative to the first body through 180°.
Figure 6A:
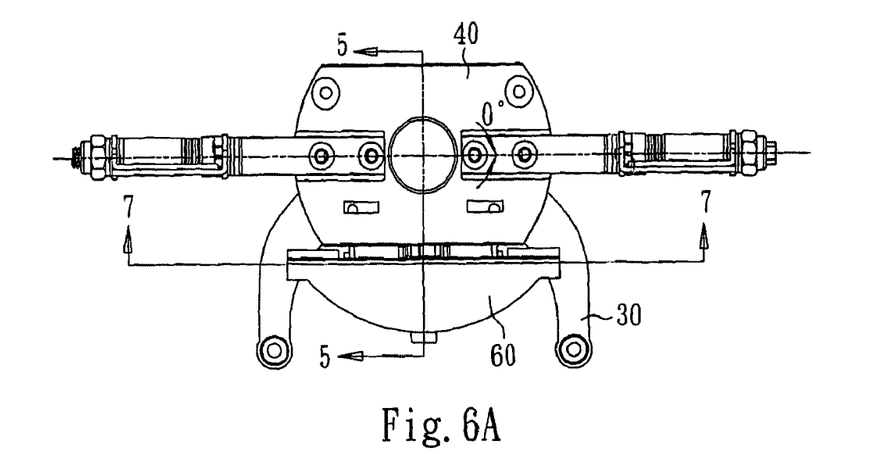
Figure 6B:
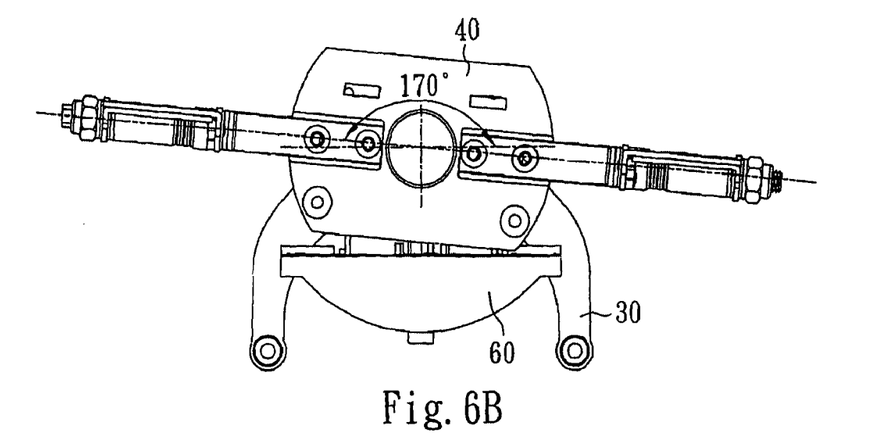
Figure 6C:
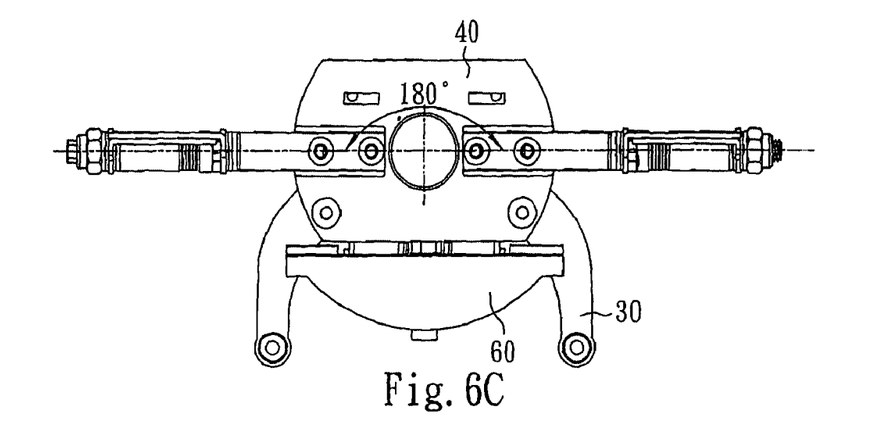
Figure 7A:
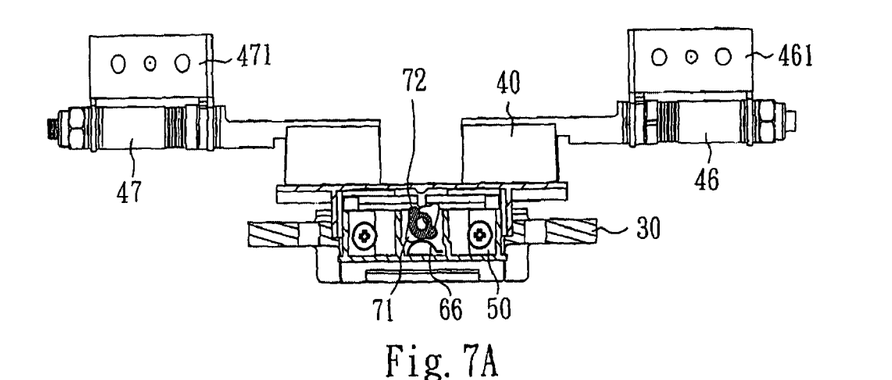
Figure 7B:
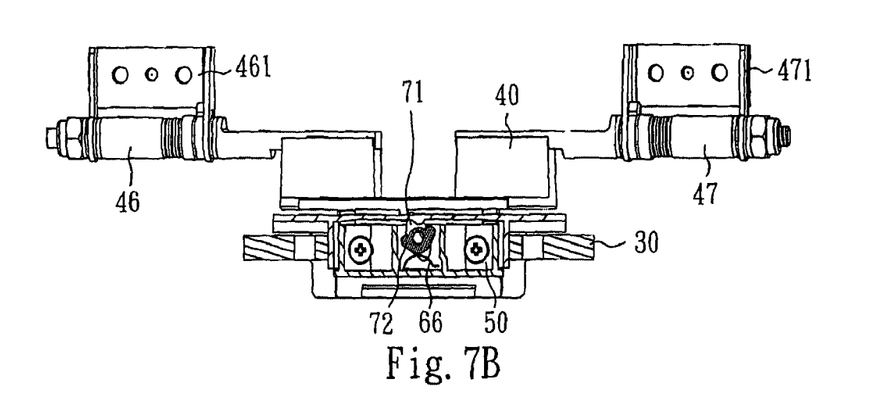
Figure 7C:
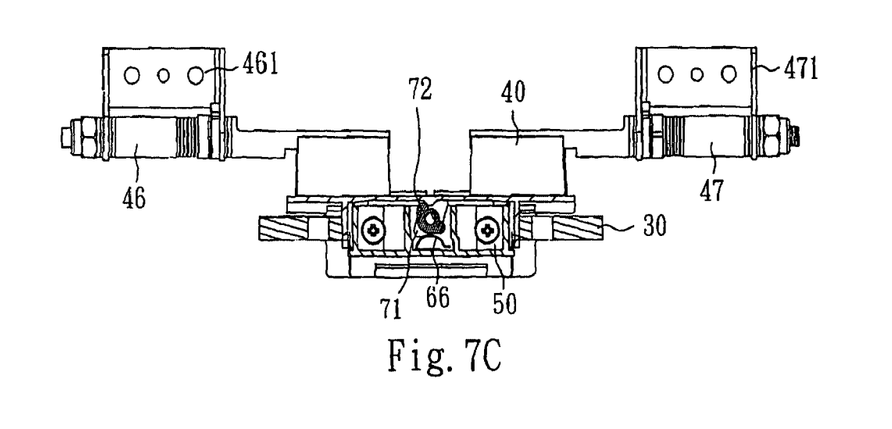

FIGS. 5A~5C, 6A~6C, and 7A~7C, illustrate different positioning status of the second body 20, wherein FIG. 6A illustrates the positioning status of the second body 20 before rotation; FIG. 6B illustrates the positioning status of the second body 20 after turned about Y-axis through 170° rotation; FIG. 6C illustrates the positioning status of the second body 20 after turned about Y-axis through 180° rotation; FIGS. 5A, 5B and 5C are cross sectional views taken along line 5-5 of FIGS. 6A, 6B and 6C respectively; FIGS. 7A, 7B and 7C are cross sectional views taken along line 7-7 of FIGS. 6A, 6B and 6C respectively. As shown in FIG. 5A and FIG. 3 again, when the button 60 is in the first position P1, the retaining portions 61 of the button 60 are disengaged from the retaining portions 52 of the seat 50, and the button 60 is held at an elevation equal to the second part 40 of the shaft 3. Therefore, the button 60 has at least one part in the first rotary path R1 to prohibit the second part 40 from making the first rotary motion M1. When moved the button 60 downwards from the first position to the second position P2 to force the retaining portions 61 of the button 60 into engagement with the retaining portions 52 of the seat 50 as shown in FIG. 5B, the button 60 is held at an elevation below the second part 40 of the shaft 3 and beyond the first rotary path R1, and therefore the second part 40 is allows to make the aforesaid first rotary motion M1.

Therefore, the user can use one single hand to press the button 60 and to move the button 60 from the first position P1 to the second position P2 to unlock the second part 40 for rotation.

Referring to FIGS. 6A and 7A, when the button 60 is in the first position P1, the second part 40 is a second angle position and prohibited from rotary motion. At this time, the second part 40 is not rotated relative to the first part 30, i.e., the positions of the first mounting frame 461 and second mounting frame 471 of the second part 40 are maintained unchanged. Referring to FIGS. 5B, 6B and 7B, when the button 60 is in the second position P2, the second part 40 is in the 170° position relative to the first part 30.

Referring to FIGS. 5C, 6C and 7C, when rotated the second part 40 to a first angle position, the second part 40 is in an 180° position relative to the first part 30, i.e., the position of the first mounting frame 461 and the position of the second mounting frame 471 are exchanged. At this time, the two contact portions 44 of the second part 40 are forced against the first cam 71 of the rotating member 70 to turn the first cam 71 and therefore the second cam 72 is rotated with the first cam 71 to push the contact portion 62 of the button 60, allowing the second flexible member 66 to push the button 60 upwards to disengage the retaining portions 61 from the retaining portions 52 of the seat 50 and the first flexible member 65 to return the button 60 from the second position P2 to the first position P1 as shown in FIG. 5C. According to the present preferred embodiment, the first angle position of the second part 40 is the position where the second part 40 has been rotated in the direction of the first rotary path R1 through the first rotary motion M1; the second angle position of the second part 40 is the zero angle position before rotation of the second part 40 in the direction of the first rotary path R1 through the first rotary motion M1. Furthermore, according to the present preferred embodiment, the two contact portions 44 of the second part 40 are arranged in a symmetrical manner, i.e., the button 60 is moved from the second position P2 to the first position P1 and positioned on the first position P1 each time the second part 40 is rotated through 180°.

Therefore, when the button 60 is in the second position P2, the retaining portions 61 of the button 60 are kept engaged with the retaining portions 52 of the seat 50, keeping the button 60 in position, i.e., pressing the button 60 through one single action changes the second part 40 from the rotation prohibited status to the rotation allowed status. When rotated the second part 40 through 180°, the upward spring force of the second flexible member 66 pushes the second part 40 upwards to disengage the retaining portions 61 from the retaining portions 52 of the seat 50, allowing the first flexible member 65 to return the button 60 from the second position P2 to the first position P1.

Although the present invention has been explained in relation to its preferred embodiment, it is to be understood that many other possible modifications and variations can be made without departing from the spirit and scope of the invention as hereinafter claimed.

What is claimed is:

1. A portable computer with a rotary positioning structure, comprising:
    a first body;
    a second body;
    a shaft, including a first part disposed on the first body and a second part disposed on the second body, wherein the second part is pivoted to the first part, and the second body movable with the second part relative to the first part to make a first rotary motion in a first rotary path;
    a seat disposed to the first body;
    a button coupled to the seat and movable between a first position and a second position for selectively prohibit rotation of the second body in the first rotary path;
    a first flexible member disposed between the button and the seat; and
    a rotating member pivotally set on the seat, including at least two cams respectively being pushed by the second part of the shaft, and being accordingly rotated to move the button from a second position to a first position when the second part is rotated to a first angle.

2. The portable computer as claimed in claim 1, wherein the seat includes at least one retaining portion; the button includes at least one retaining portion adapted to engage the retaining portion of the seat, the at least one retaining portion of the button being engaged with the at least one retaining portion of the seat when the button is in the second position, the at least one retaining portion of the button being disengaged from the at least one retaining portion of the seat when the button is in the first position.

3. The portable computer as claimed in claim 2, further including a pivot member fixedly provided at the seat, and the rotating member pivotally mounted on the pivot member; and wherein the rotating member further forces the at least one retaining portion of the button away from the at least one retaining portion of the seat for enabling the first flexible member to return the button to the first position when the second part of the shaft is rotated to the first angle.

4. The portable computer as claimed in claim 3, wherein the button includes at least one contact portion; the second part of the shaft includes at least one contact portion adapted to touch and rotate the first cam to thereby rotate the second cam into contact with the at least one contact portion of the button.

5. The portable computer as claimed in claim 1, wherein the second body is movable with the second part of the shaft relative to the first part of the shaft to make a second rotary motion in a second rotary path.

6. The portable computer as claimed in claim 5, wherein the first rotary motion is to turn about a first axis; the second rotary motion is to turn about a second axis, which is perpendicular to the first axis.

7. The portable computer as claimed in claim 1, wherein the seat is disposed to the first part of the shaft.

8. The portable computer as claimed in claim 1, further including a second flexible member, the second flexible member being a spring plate disposed to the seat and adapted to push the button to the first position when the second part is rotated to the first angle.

9. The portable computer as claimed in claim 8, wherein the seat includes an accommodation chamber, and at least one sliding rail adapted to guide movement of the button between the first position and the second position; the first flexible member is a coil spring accommodated in the accommodation chamber of the seat.

\* \* \* \* \*